(12) United States Patent
Chen

(10) Patent No.: US 7,014,179 B1
(45) Date of Patent: Mar. 21, 2006

(54) ADJUSTABLE CUSHION DEVICE

(76) Inventor: Chao-Hu Chen, No. 186, Da Chou Rd., Shen Kang Hsiang, Taichung Hsien (TW)

( * ) Notice: Subject to any disclaimer, the term of this patent is extended or adjusted under 35 U.S.C. 154(b) by 0 days.

(21) Appl. No.: 10/950,405

(22) Filed: Sep. 28, 2004

(51) Int. Cl.
*B60G 13/00* (2006.01)

(52) U.S. Cl. .................. 267/208; 267/293; 267/276; 188/282.4

(58) Field of Classification Search ............... 267/293, 267/201, 208, 276, 215, 273; 16/54, 304, 16/342; 4/240, 241, 236; 188/282.4
See application file for complete search history.

(56) References Cited

U.S. PATENT DOCUMENTS

| | | | | |
|---|---|---|---|---|
| 5,419,013 A | * | 5/1995 | Hsiao | 16/54 |
| 6,464,052 B1 | * | 10/2002 | Hsiao | 188/293 |
| 6,913,252 B1 | * | 7/2005 | Hayashi | 267/201 |

* cited by examiner

*Primary Examiner*—Melanie Torres

(57) ABSTRACT

A bicycle adjustable cushion device includes an outer tube with a connection cap connected to a first end thereof and an inner tube has a first end movably and rotatably inserted in a second end of the outer tube. A rod has a first end fixed to the connection cap and a second end of the rod movably inserted through a polygonal hole in an end plate threadedly connected to the first end of the inner tube. An elastic rubber is received in the outer tube and the rod extends through the elastic rubber. Two ends of the elastic rubber are in contact with an inside of the connection cap and the end plate which is movable to compress the elastic rubber by rotating the inner tube.

5 Claims, 5 Drawing Sheets

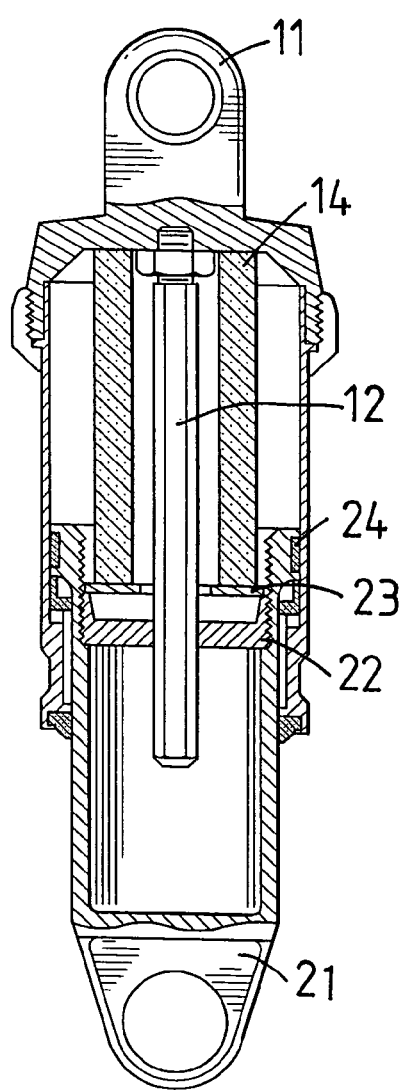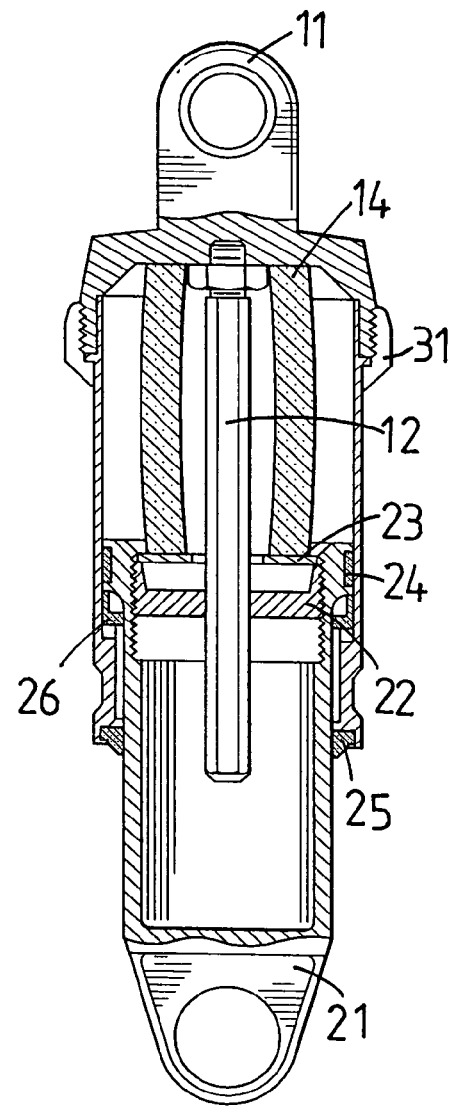
FIG. 3
FIG. 4

ADJUSTABLE CUSHION DEVICE

FIELD OF THE INVENTION

The present invention relates to an adjustable cushion device for bicycles.

BACKGROUND OF THE INVENTION

A conventional bicycle cushion device generally includes an outer tube connected to the wheel shaft and an inner tube which is movably inserted in the outer tube and connected to the bicycle frame. A spring is used to absorb the load and the inner tube moves into the outer tube. When the bicycle is ridden on a uneven road, the shock is absorbed by the deformation of the spring so that the rider can control the bicycle comfortably. However, the spring has a fixed physical character which cannot be adjusted according needs. If the spring is too "stiff", it cannot absorb the shocks. If the spring is too "soft", the rider is difficult to control the bicycle.

The present invention intends to provide an adjustable cushion device which includes an elastic rubber compressible between an outer tube and an inner tube which is movably connected to the outer tube.

SUMMARY OF THE INVENTION

The present invention relates to a cushion device which comprises an outer tube and a connection cap is connected to a first end of the outer tube. A rod having a polygonal cross section extends through the outer tube and has a first end fixed to the connection cap. An elastic rubber is received in the outer tube and the rod extends through the elastic rubber. An inner tube has a first end movably and rotatably inserted in a second end of the outer tube and an end plate is threadedly connected to the first end of the inner tube. The rod movably extends through a polygonal hole in the end plate. Two ends of the elastic tuber contact an inside of the connection cap and the end plate respectively. The end plate is movable to compress the elastic rubber by rotating the inner tube.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3 is a cross sectional view to show the cushion device of the present invention;

FIG. 4 is a cross sectional view to show the first elastic rubber is compressed by rotating the inner tube of the cushion device of the present invention;

DETAILED DESCRIPTION OF THE PREFERRED EMBODIMENT

Figure 7:
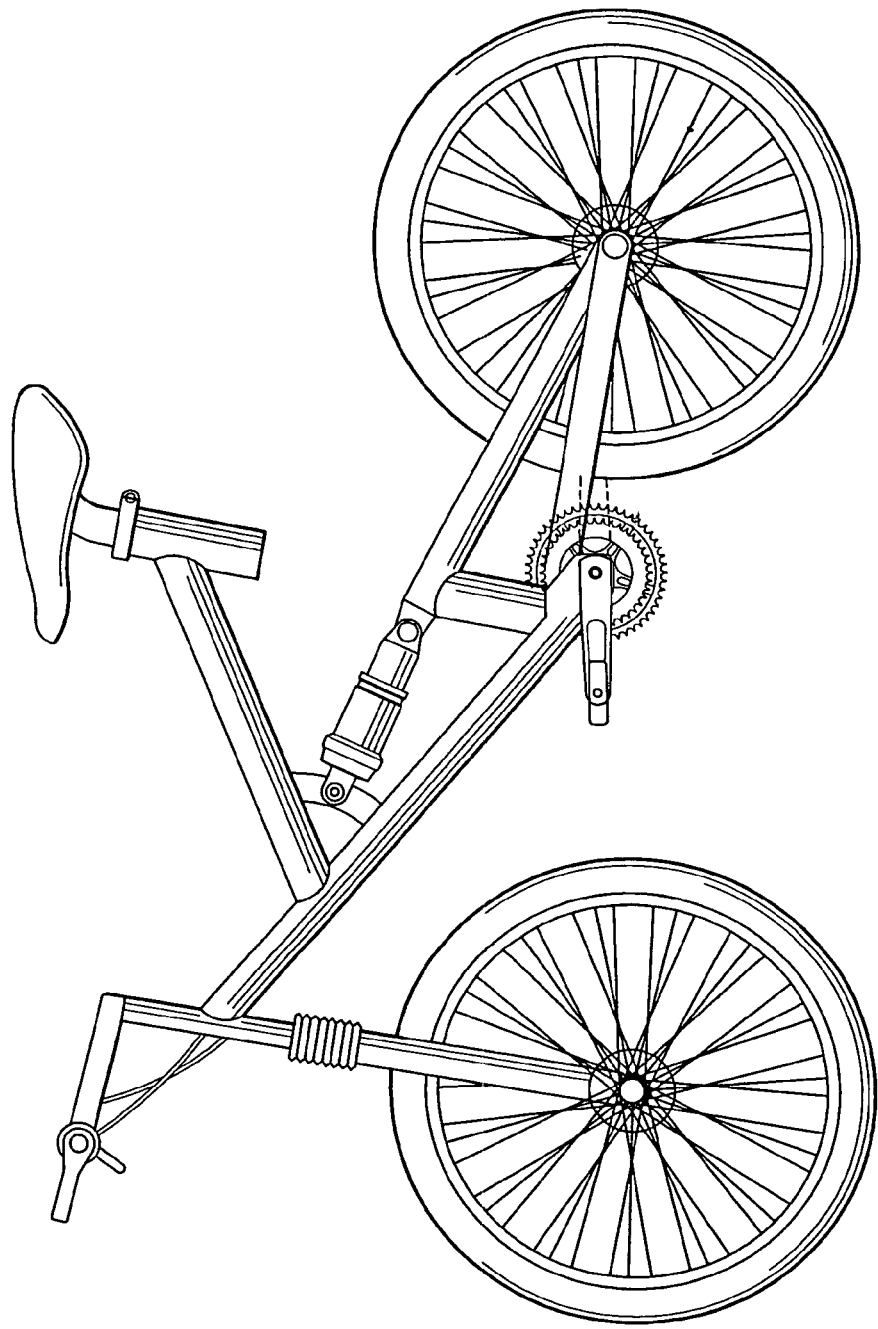
FIG. 7 shows the cushion device of the present invention is installed to a bicycle.

Referring to FIGS. 1 to 3 and 7, the cushion device of the present invention comprises an outer tube 30 and a connection cap 11 is connected to a first end of the outer tube 30. The connection cap 11 includes a threaded outer periphery 111 and a locking ring 31 is mounted to the outer tube 30 and threadedly engaged with the threaded outer periphery 111. The connection cap 11 includes a connection ring which is connected to a bicycle frame as shown in FIG. 7. A rod 12 having a polygonal cross section extends through the outer tube 30 and has a first end fixed to an inside of the connection cap 11 by a nut 13. A first elastic rubber 14 is received in the outer tube 30 and the rod 12 extends through the first elastic rubber 14.

An inner tube 21 has a first end rotatably and movably inserted in a second end of the outer tube 30 and an inner threaded periphery 212 is defined in the first end of the inner tube. An end plate 22 is threadedly connected to the inner threaded periphery 212. A groove 211 is defined in an outer periphery of the first end of the inner tube 21 and a first collar 24 is engaged with the groove 211 and in contact with an inner periphery of the outer tube 30. A second collar 26 is secured in an inner periphery of the second end of the outer tube 30 and in contact with an outer periphery of the first end of the inner tube 21. The end plate 22 has a polygonal hole 220 defined therethrough and the rod 12 movably extends through the polygonal hole 220 and a washer 23 is mounted to the rod 12. Two ends of the first elastic tuber 14 contact the inside of the connection cap 11 and the end plate 22 respectively. A seal ring 25 is engaged with the second end of the outer tube 30 and mounted to the inner tube 21 so as to prevent dust from entering the outer tube 30.

As shown in FIG. 4, the reaction force of the first elastic rubber 14 can be adjusted by rotating the inner tube 21 and the end plate 22 is then moved to compress the first elastic rubber 14. In other words, when the rider is heavy, the rider may rotate the inner tube 21 counter clockwise to compress the first elastic rubber 14 so as to have larger reaction force.

Figure 1:
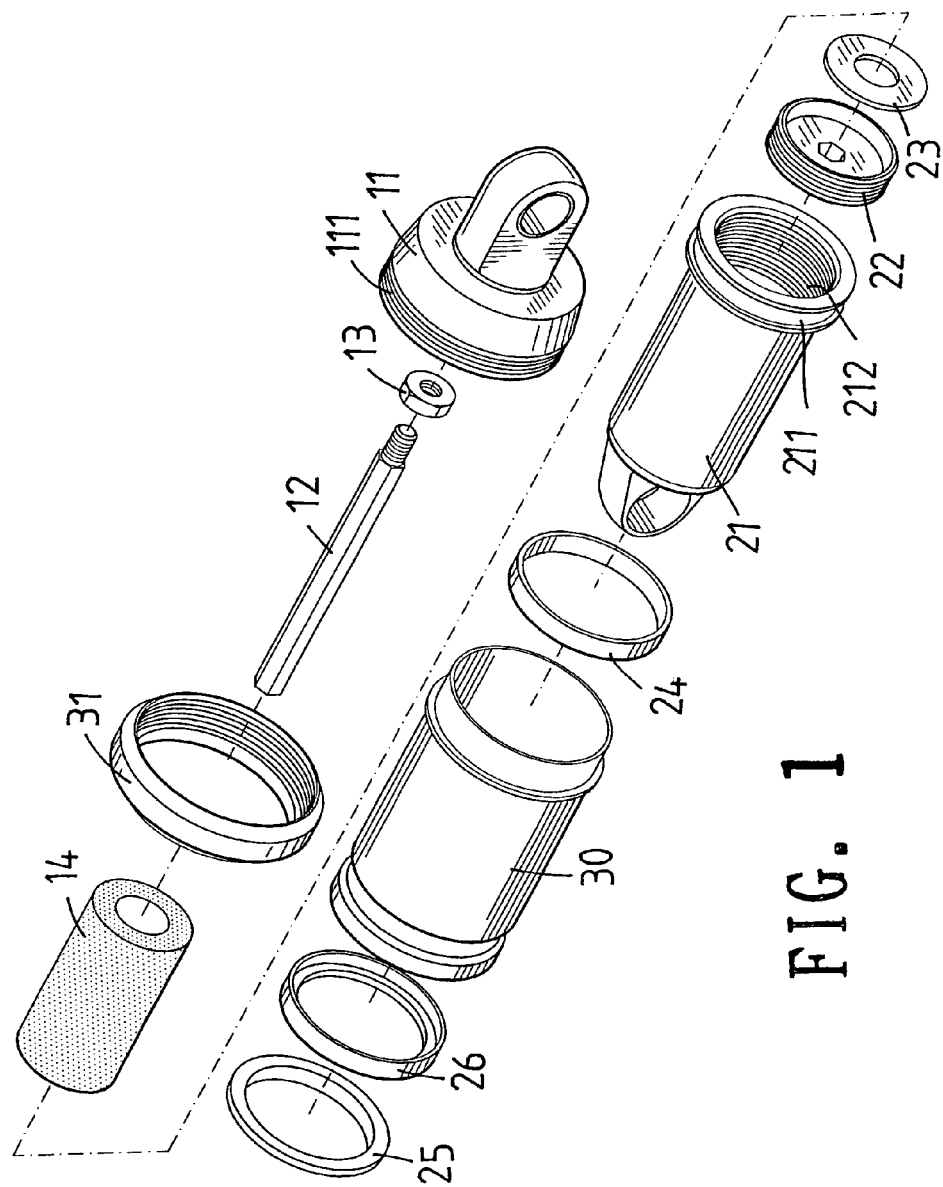
FIG. 1 is an exploded view to show the cushion device of the present invention.
Figure 2:
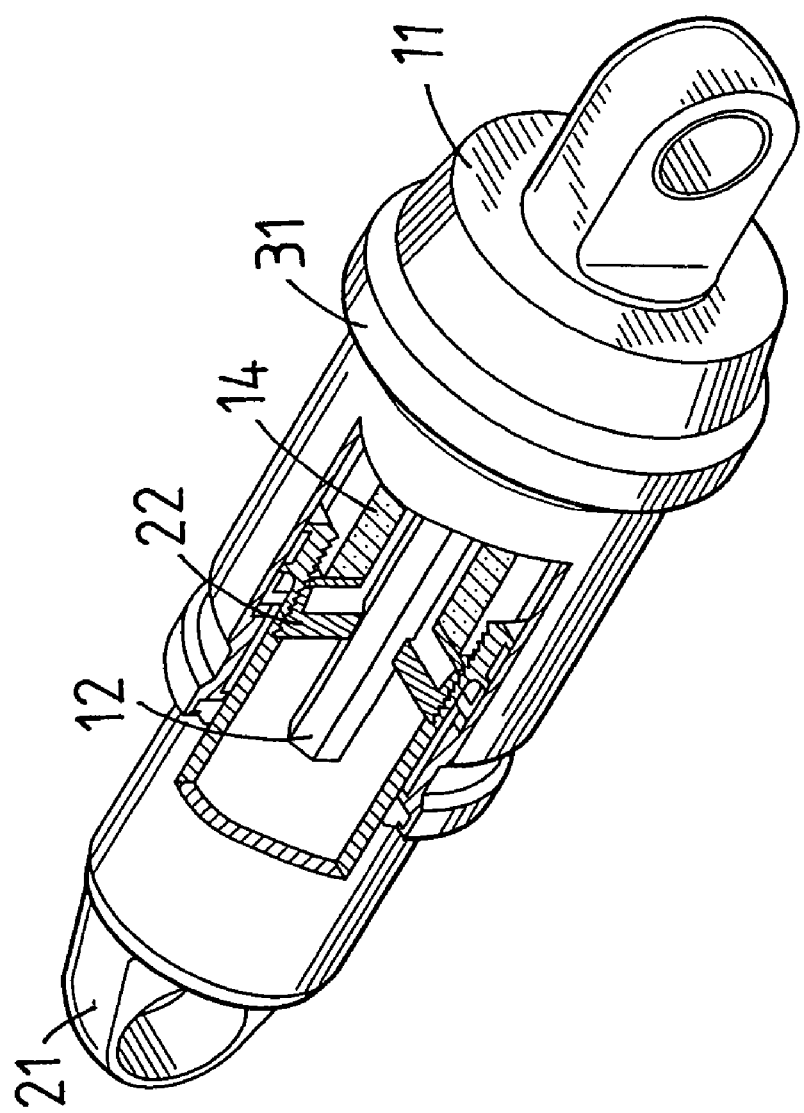
FIG. 2 is a perspective view, partly removed, of the cushion device of the present invention.
Figure 5:
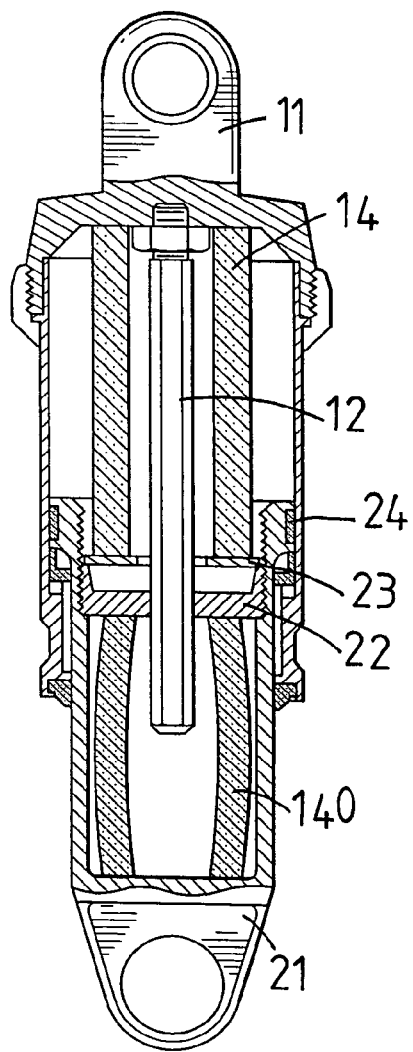
FIG. 5 is a cross sectional view to show another embodiment of the cushion device of the present invention, wherein a second elastic rubber is compressed.
Figure 6:
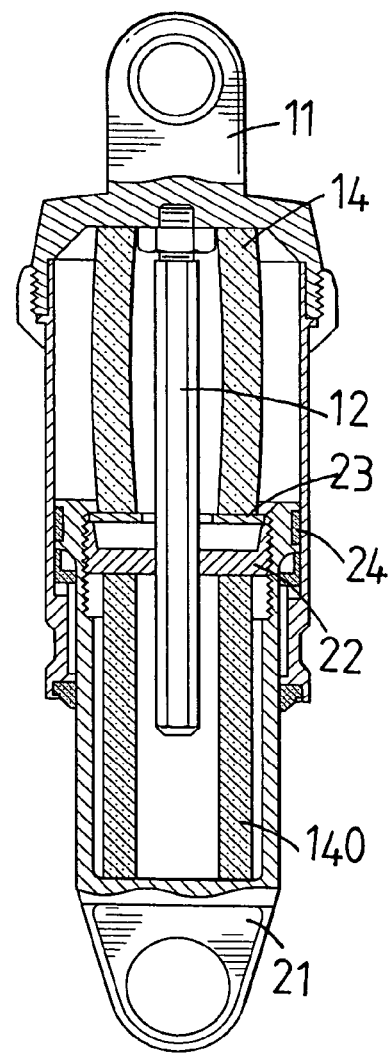
FIG. 6 is a cross sectional view to show the cushion device in FIG. 5, wherein the first elastic rubber is compressed.

FIGS. 5 and 6 show another embodiment of the cushion device of the present invention and comprises a second elastic rubber 140 which is located in the inner tube 21 and two ends of the second elastic tuber 140 contact the end plate 22 and an inside of the second end of the inner tube 21. The rider may adjust the first elastic rubber 14 and/or the second elastic rubber 140 to be compressed. By this way, the rider can have more options to adjust the cushion device according to different practical needs.

While we have shown and described the embodiment in accordance with the present invention, it should be clear to those skilled in the art that further embodiments may be made without departing from the scope of the present invention.

What is claimed is:

1. A cushion device comprising:
   an outer tube;
   a connection cap connected to a first end of the outer tube and a rod extending through the outer tube and having a first end fixed to the connection cap, the rod having a polygonal cross section;
   a first elastic rubber received in the outer tube and the rod extending through the first elastic rubber; and
   an inner tube having a first end rotatably and movably inserted in a second end of the outer tube and an end plate threadedly connected to the first end of the inner tube, the end plate having a polygonal hole defined therethrough and the rod movably extending through the polygonal hole, two ends of the first elastic rubber contacting an inside of the connection cap and the end plate, the end plate being movable to compress the first elastic rubber by rotating the inner tube.

2. The cushion device as claimed in claim 1, wherein the inner tube includes a groove defined in an outer periphery of the first end thereof and a first collar is engaged with the groove and in contact with an inner periphery of the outer tube.

3. The cushion device as claimed in claim 1 further comprising a second collar secured in an inner periphery of the second end of the outer tube and being in contact with an outer periphery of the first end of the inner tube.

4. The cushion device as claimed in claim 1 further comprising a seal ring engaged with the second end of the outer tube and mounted to the inner tube.

5. The cushion device as claimed in claim 1 further comprising a second elastic rubber located in the inner tube and two ends of the second elastic tuber contacting the end plate and an inside of the second end of the inner tube.

* * * * *